Jan. 9, 1962 G. C. LARSON 3,015,891
PRECISION UNIVERSAL GAUGE
Filed Oct. 17, 1958 2 Sheets-Sheet 1
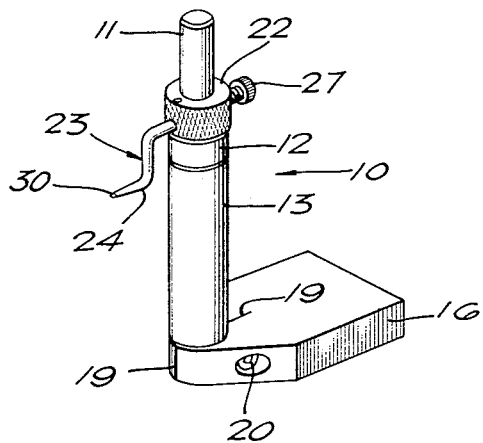
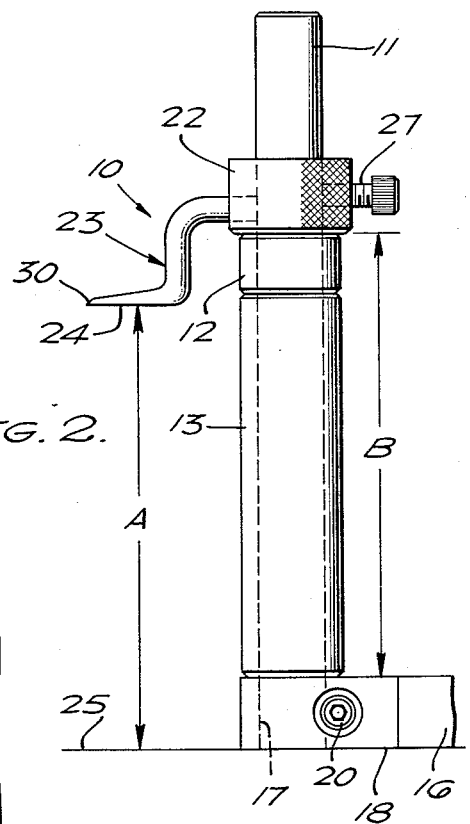
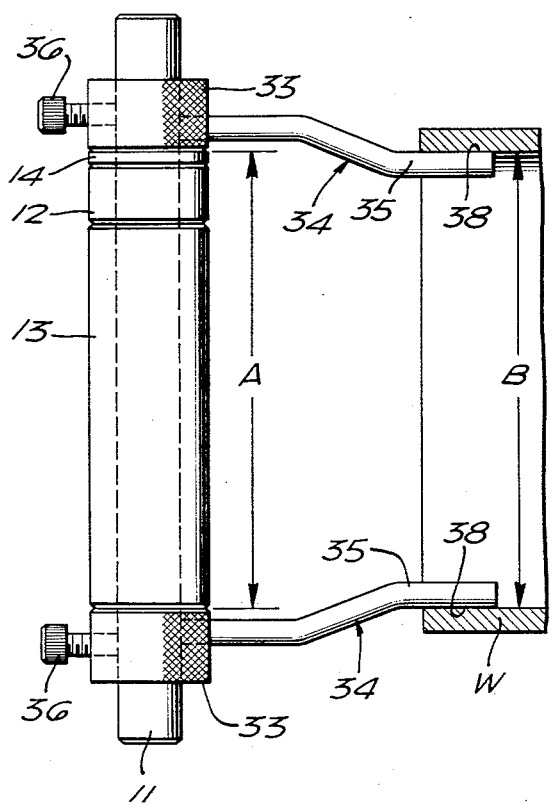
GEORGE C. LARSON
INVENTOR.
BY
ATTORNEY

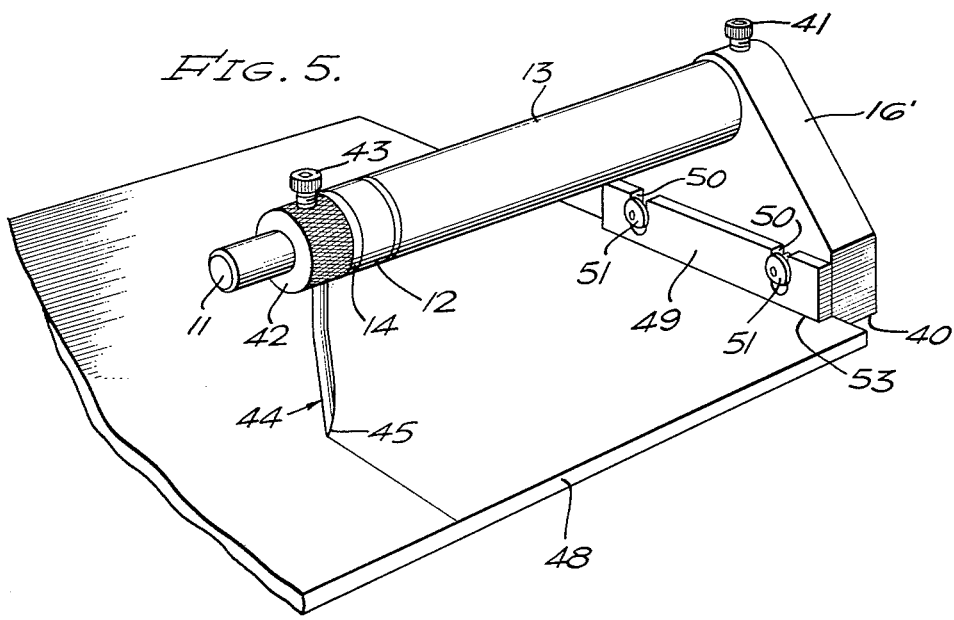
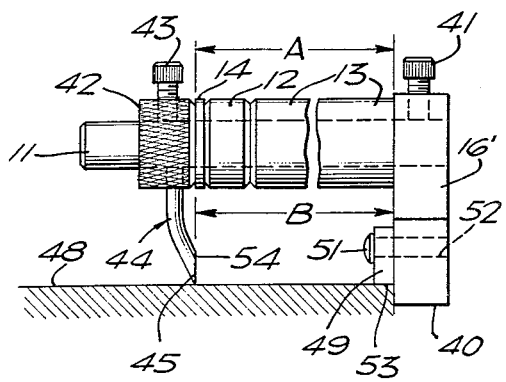
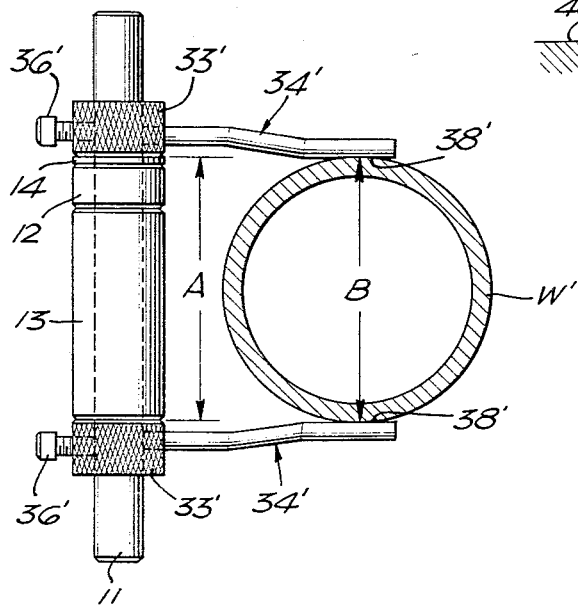

United States Patent Office 3,015,891
Patented Jan. 9, 1962

3,015,891
PRECISION UNIVERSAL GAUGE
George C. Larson, 527 Giano Ave., La Puente, Calif.
Filed Oct. 17, 1958, Ser. No. 767,892
1 Claim. (Cl. 33—143)

This invention relates to precision gauges for use by tool and die makers and more particularly to an improved gauge of this type employing precision gauge blocks adapted to be held assembled on a mandrel and utilizing accurately finished terminal members as an aid in making a variety of precise measurements.

Machinists and tool makers have need for making exacting measurements using standard high precision gauge blocks. The widely known Johansson gauge blocks commonly used are stacked together to a height corresponding to the measurement to be made. This practice meets certain requirements provided the member to be measured can be rested against a precision work surface or datum plane on which selected Johansson blocks can be stacked to equal the height of a particular surface above this datum plane. However Johansson blocks are unsuitable for measuring other than vertical distances above the datum plane and are useless in measuring either internal or external diameters, and many others.

To meet this serious limitation of Johansson and the like gauge blocks certain proposals have been made for a gauge having provision for holding these blocks rigidly assembled in such manner that a selected group thereof can be picked up as a unit and used to make measurements. For example, there have been proposals for forming the blocks as cylinders of varying axial lengths and provided with axial bores through which clamping screws can be inserted. However, these and others of a similar nature are all subjected to serious disadvantages obviated by the present invention. For example, experience has demonstrated the impracticability of providing either the gauge blocks or the member supporting the blocks with threads, notches, grooves or the like for the reason that these impart undesirable stresses and strains to the blocks.

A further and particularly serious shortcoming is the fact that prior gauging devices have been primarily useful in making but a single or a very limited number of measurements.

The universal precision gauge provided by the present invention obviates the foregoing and other shortcomings of prior gauges and provides a set of high precision tubular gauge blocks along with a few simple auxiliaries by the aid of which a wide variety of precision measurements can be made with or without a datum plane and including both internal and external measurements in any orientation relative to the horizontal. The tool of this invention is also useful in making high precision guide lines on a workpiece without regard to the disposition of the surface to a datum plane.

Essentially the gauge comprises a large diameter rigid mandrel preferably free of bores, slots, notches, grooves, threads or other special configurations. This mandrel provides a rigid, snug-fitting support for a selected group of tubular precision gauge blocks which may be held closely assembled together on the mandrel by any of a variety of auxiliaries depending upon the use to be made of the gauge. If vertical measurements are to be taken, a precision base plate is clamped to the mandrel with its outer surface flush with the accurately finished mandrel end, an appropriate feeler probe or marker being assembled over the other end of the mandrel snug against the assembled blocks. The reference surface of the feeler is so positioned as to compensate for the thickness of the base plate to the end that the gauge may be rested against a datum plane or other true surface with the feeler opposite the point on the workpiece being checked or measured.

If it is desired to make a guide line on some surface at a precise distance from and parallel to another surface it is merely necessary to pass the base plate of the gauge across the latter surface as the pointed end of the feeler makes a faint impression on the work surface.

In other uses of the tool, a desired selection of gauge blocks can be held assembled on the mandrel by precision probes or feelers designed for making either internal or external measurements. Still another auxiliary mountable on the mandrel in lieu of the base plate and formed in a generally similar manner permits the use of the gauge in drawing guide lines at a precise distance parallel to an edge of a workpiece.

Accordingly, it is a primary object of the present invention to provide an improved universal gauge tool suitable for use in making measurements of a variety of widely different types, including both external and internal measurements, all without need for the usual horizontal datum plane.

Another object of the invention is the provision of a precision gauge utilizing tubular gauge blocks and a supporting mandrel in association with a selected pair of accessories mounted on the opposite ends of the mandrel.

Another object of the invention is the provision of a portable universal gauge tool comprising tubular gauge blocks mountable over a rigid mandrel and including a pair of precision probe accessories adapted to be securely clamped to the opposite ends of the mandrel with their remote opposite side walls lying flush with a plane flush with the opposite ends of the gauge block assembly whereby the gauge may be used to check internal measurements of a workpiece.

Another object of the invention is the provision of a simple, lightweight precision gauge utilizing tubular gauge blocks adapted to be held assembled over a precision mandrel in combination with a pair of precision probe accessories clampable against the opposite ends of the block assembly and having facing side walls lying parallel to one another and flush with the end faces of the block assembly whereby the gauge may be used in checking external dimensions of a workpiece.

Another object of the invention is the provision of means for holding a series of tubular gauge blocks rigidly assembled by means including a scribe accessory useful in marking a guide line on a workpiece parallel to one edge thereof and at a precise distance therefrom.

These and other more specific objects will appear upon reading the following specification and claims and upon considering in connection therewith the attached drawings to which they relate.

Referring now to the drawings in which preferred embodiments of the invention are illustrated:

FIGURE 1 is a perspective view of a universal gauge incorporating the present invention as assembled for use in making measurements using the base plate accessory;

FIGURE 2 is a fragmentary elevational view of the tool shown in FIGURE 1 on an enlarged scale;

FIGURE 3 is a plan view of the gauge assembled with feeler accessories employed in making internal measurements on a workpiece;

FIGURE 4 is a view similar to FIGURE 3 but on a slightly smaller scale showing a different set of feeler accessories in place and useful in measuring external distances on a workpiece;

FIGURE 5 is a perspective view of the gauge assembled with scribe and guide plate accessories arranged for use in drawing a guide line parallel to one edge of a workpiece; and FIGURE 6 is a vertical plan view of the gauge assembled as illustrated in FIGURE 5 showing certain critical dimensional relationships.

Referring first to FIGURES 1 and 2 there is shown one of the many possible modes of assembling the components and accessories comprising the present invention, the assembly there shown being designated generally 10. This assembly includes a relatively large diameter, accurately-finished cylindrical mandrel 11 free of threads, bores and special configurations, and having both ends normal to the axis of the mandrel. It will be understood that both mandrel 11 and a set of high precision gauge blocks of carefully selected axial lengths are used in all embodiments and modes of use of the disclosed gauge tool. Gauge blocks indicated at 12, 13 are typical of these blocks.

A combined clamping accessory and base plate useful in holding gauge blocks 12 and 13 assembled to mandrel 11 comprises a flat plate 16 having a bore 17 fitting snugly over the mandrel. As is best shown in FIGURE 1, plate 16 may be provided with a slit 19 opening diametrically through bore 17 to the end that a clamping screw 20 traversing this slit and seating within a threaded bore to the far side of the slit will be effective when tightened to clamp the base plate firmly to the mandrel. Tightening of the clamp is performed while care is taken that the lower end of the mandrel rests firmly against a flat surface or lies flush with the lower face of plate 16.

The accessory commonly used at the opposite ends of the gauge blocks from base plate 16 comprises a clamping ring 22 having secured rigidly thereto an L-shaped probe 23 provided on the lower side thereof with a reference surface 24 parallel to datum plane 25 and the lower face 18 of base plate 16. A thumb screw 27 seated in a threaded radial bore of ring 22 serves to clamp ring 22 firmly to the mandrel while in snug contact with the outer end face of gauge block 12.

An important feature of the described arrangement of the gauge tool is the fact that vertical distances A and B, parallel to mandrel 11, are exactly equal to each other and to the axial length of gauge blocks 12 and 13. Stated otherwise, the axial spacing between the upper end face of block 12 and reference surface 24 of probe 23 exactly equals the thickness of base plate 16. Accordingly, in one mode of use, the operator rests the base of the tool on a flat surface with the pointed end 30 of probe 23 opposite the other terminal of the measurement being made. When the end 30 is exactly opposite the point being measured, the operator knows that the distance of this point from datum plane 25 exactly equals the combined length of blocks 12 and 13.

If the operator desires to draw a guide line on a workpiece parallel to datum plane 25 and spaced therefrom a distance equal to the combined length of blocks 12 and 13, it is merely necessary to place base plate 16 on the datum plane with the pointed end 30 of probe 23 against the surface to be marked. The tool is then drawn along the datum surface as scribing point 30 is pressed lightly against the surface to be marked.

Referring now to FIGURES 3 and 4, there is shown a different assembly of the components comprising the present micrometer tool. In this arrangement, an additional gauge block 14 has been assembled on the mandrel along with blocks 12 and 13. These blocks are held in assembled position in FIGURE 3 by a pair of similar clamping and sensing probes, each consisting of a clamping ring 33 and a sensing probe 34 fixed thereto with the outer end 35 extending normally to the axis of mandrel 11. Each clamping ring 33 is adapted to be clamped in any desired position along mandrel 11 required by the blocks to be held closely assembled thereon by knurled cap screws 36 threadedly seated in bores of rings 33 with their inner ends bearing against mandrel 11. Sensing probes 34 have accurately finished reference surfaces 38 on the sides of the probes remote from one another and accurately finished to lie flush with the end face surface of an associated gauge block.

Thus, in FIGURE 3 the combined lentgh of gauge blocks 12, 13 and 14 is represented by A and exactly equals the distance between reference surfaces 38, 38 of the two probes 34. The described gauge tool assembled in this manner is used to measure internal dimensions as, for example, the distance B in a workpiece W.

The assembly of the components shown in FIGURE 4 is generally similar to that described in connection with FIGURE 3 with the exception that a modified set of probe accessories is employed. These are generally similar to the corresponding accessories in FIGURE 3, except that the distance between the parallel reference surfaces 38', 38' exactly equals the combined heights of gauge blocks 12, 13 and 14, it being noted that reference surfaces 38', 38' are along the adjacent side walls of probes 34', 34' rather than on the remote side walls thereof as was true of FIGURE 3. Accordingly, the gauge tool assembly shown in FIGURE 4 is suitable for measuring external diameters of a conduit or other workpiece W'.

In FIGURES 5 and 6, there is shown a different assembly of the gauge tool making use of modified clamping accessories including a precision scriber device particularly useful in marking a workpiece with a line parallel to one edge. It will be recognized that certain of the parts are identical with those described in FIGURES 1 to 4. The accessory used at the lower end of mandrel 11 comprises a base plate 16' of the general configuration shown including a flat wide end face 40 remote from the mandrel. A clamping screw 41 serves to clamp the base plate to one end of the mandrel. A second clamping accessory comprises a ring 42 fitting snugly over the mandrel and clampable thereto by means of a cap screw 43. Rigidly secured to and projecting from the periphery of ring 42 is a scriber 44 having a pointed end 45 adapted to scribe a line on a workpiece, such as plate 48. Mounted adjustably against one face of base plate 16' is an accurately finished stop plate 49 having notches 50 opening inwardly from one edge and through which clamping screws 51 extend into threaded bores 52 in plate 16'. The lower edge 53 of member 49 is adjusted to lie parallel with the lower edge 40 of plate 16' and to provide a supporting guide resting on the edge of plate 48. It is important that the supporting edge 53 of stop member 49 be spaced the same radial distance from the axis of mandrel 11 as the point 45 of scribe 44.

As is shown in FIGURE 6, reference surface 54 of scribe 44 lies flush with the end surface of ring 42. In consequence, it is known that the pointed end 45 of surface 54 is located exactly the same distance from the adjacent accurately finished surface of plate 16' as the combined heights of the gauge blocks mounted on the mandrel. In other words, the distance between points 45 and the inner face of plate 16' is represented by B and equals the combined axial lengths A of blocks 12, 13 and 14.

Should it be necessary to sharpen the point 45 of scribe 44, the distance of the scribe tip from the axis of mandrel 11 will be decreased slightly. It will then be necessary to adjust supporting guide plate 49 by a corresponding amount to effect compensation for the shortening of the scribe by first loosening clamping screws 51, 51. After member 49 has been adjusted so that edge 53 is the same distance from mandrel 11 as scribe point 45, screws 51 are reclamped firmly in place.

From the foregoing description of various assemblies of the components comprising the universal gauge tool constituting this invention, it will be appreciated that a high precision tool has been provided capable of making an unusually wide range and variety of measurements with or without the aid of a datum plane. Once the components required for a given measurement are secured together, the gauge may be readily applied across the points to be measured and maneuvered in any manner required to make a precision measurement. Additionally, the tool may be employed as a scribe as well as a gauge for checking the accuracy of the scribe mark.

While the particular universal micrometer gauge tool herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claim.

I claim:

A precision gauge for use by tool and die makers comprising a single smooth-surface rigid cylindrical mandrel, a plurality of tubular gauge blocks having a close sliding fit over said mandrel, said blocks being precision finished to different predetermined axial lengths whereby the distance between the opposite end faces of a plurality thereof assembled in snug abutting relation on said mandrel can be used to measure accurately distances between two points directly opposite said end faces, feeler means having a close sliding fit over said mandrel with one surface of said feeler means fixedly positioned directly opposite the outer end face of an end gauge block when said feeler means is positioned in snug contact with the latter, and a pair of said feeler means securable to said mandrel at the opposite ends of said gauge block while assembled on said mandrel, said feeler means each including a cylindrical rigid probe projecting normally to said mandrel and lying parallel to one another, the remote side walls of the outer ends of said probes lying in the same plane as the outer end face of an associated one of said gauge blocks and being adapted for use in measuring an internal dimension of an opening in a workpiece or the like.

References Cited in the file of this patent

UNITED STATES PATENTS

| | | |
|---|---|---|
| 642,750 | Nielsen | Feb. 6, 1900 |
| 1,491,099 | Hoke | Apr. 22, 1924 |
| 1,491,100 | Hoke | Apr. 22, 1924 |
| 2,536,401 | Victor | Jan. 2, 1951 |
| 2,603,873 | Shaw | July 22, 1952 |
| 2,650,436 | Gessler | Sept. 1, 1953 |
| 2,831,256 | Werle | Apr. 22, 1958 |
| 2,853,786 | Ellstrom | Sept. 30, 1958 |

FOREIGN PATENTS

| | | |
|---|---|---|
| 125,908 | Sweden | Aug. 30, 1949 |

OTHER REFERENCES

"Johansson Gage Blocks and Accessories," Catalog No. 17, June 1, 1945, Ford Motor Company, Johansson Division, Dearborn, Michigan. (Copy in Div. 66.)